United States Patent
Driscoll et al.

(10) Patent No.: US 7,018,442 B2
(45) Date of Patent: Mar. 28, 2006

(54) METHOD AND APPARATUS FOR REGENERATING NOX ADSORBERS

(75) Inventors: J. Joshua Driscoll, Dunlap, IL (US); Dennis L. Endicott, Peoria, IL (US); Stephen A. Faulkner, Stamford (GB); Maarten Verkiel, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 237 days.

(21) Appl. No.: 10/721,837

(22) Filed: Nov. 25, 2003

(65) Prior Publication Data

US 2005/0109208 A1    May 26, 2005

(51) Int. Cl.
*B01D 53/04* (2006.01)
*F01N 3/00* (2006.01)

(52) U.S. Cl. .................. 95/1; 60/274; 60/276; 60/295; 55/385.3; 55/DIG. 30; 95/129; 95/148; 96/109; 96/130; 96/143

(58) Field of Classification Search .................. 60/274, 60/276, 285, 295; 55/385.3, DIG. 10, DIG. 30; 95/1, 8, 11, 21, 114, 128, 129, 148; 96/109, 96/111, 130, 143, 146; 123/361, 399
See application file for complete search history.

(56) References Cited

U.S. PATENT DOCUMENTS

| | | | |
|---|---|---|---|
| 4,471,610 A | 9/1984 | Watanabe | |
| 4,691,677 A | 9/1987 | Hotate et al. | |
| 5,771,686 A | 6/1998 | Pischinger et al. | |
| 5,946,905 A * | 9/1999 | Bouwman | 60/274 |
| 5,979,158 A | 11/1999 | Kaiser et al. | |
| 6,062,190 A | 5/2000 | Nakajima | |
| 6,119,450 A | 9/2000 | Boegner et al. | |
| 6,171,565 B1 * | 1/2001 | Hohne et al. | 423/239.1 |
| 6,196,183 B1 | 3/2001 | Bauer et al. | |
| 6,233,921 B1 * | 5/2001 | Enderle et al. | 60/274 |
| 6,233,927 B1 * | 5/2001 | Hirota et al. | 60/297 |
| 6,304,815 B1 | 10/2001 | Moraal et al. | |
| 6,318,073 B1 * | 11/2001 | Boegner et al. | 60/274 |
| 6,415,602 B1 * | 7/2002 | Patchett et al. | 60/286 |
| 6,467,258 B1 | 10/2002 | Jobson et al. | |
| 6,481,199 B1 | 11/2002 | Bidner et al. | |
| 6,497,095 B1 | 12/2002 | Carberry et al. | |
| 6,530,216 B1 * | 3/2003 | Pott | 60/295 |
| 6,722,125 B1 * | 4/2004 | Pfalzgraf | 60/295 |
| 6,871,492 B1 * | 3/2005 | Huynh et al. | 60/295 |
| 6,935,102 B1 * | 8/2005 | Lindskog | 60/285 |
| 6,941,747 B1 * | 9/2005 | Houston et al. | 60/295 |
| 2001/0027785 A1 * | 10/2001 | Almkvist | 123/675 |
| 2001/0032457 A1 * | 10/2001 | Ludwig et al. | 60/285 |
| 2001/0054282 A1 * | 12/2001 | Lang et al. | 60/277 |
| 2002/0007628 A1 * | 1/2002 | Bidner et al. | 60/277 |
| 2002/0038543 A1 * | 4/2002 | Nishimura et al. | 60/284 |
| 2002/0092297 A1 * | 7/2002 | Hertzberg | 60/295 |
| 2002/0108367 A1 * | 8/2002 | Surnilla et al. | 60/285 |
| 2002/0189246 A1 * | 12/2002 | Hepburn et al. | 60/295 |
| 2003/0010016 A1 * | 1/2003 | Beer et al. | 60/274 |
| 2003/0051469 A1 * | 3/2003 | Loerch et al. | 60/286 |

(Continued)

Primary Examiner—Robert H. Spitzer

(57) ABSTRACT

Methods and apparatuses for regenerating a NOx adsorber coupled with an exhaust of an engine. An actuator drives a throttle valve to a first position when regeneration of the NOx adsorber is desired. The first position is a position that causes the regeneration of the NOx adsorber. An actuator drives the throttle valve to a second position while regeneration of the NOx adsorber is still desired. The second position being a position that is more open than the first position and operable to regenerate a NOx adsorber.

22 Claims, 1 Drawing Sheet

TIME (Seconds)

U.S. PATENT DOCUMENTS

| | | | |
|---|---|---|---|
| 2003/0066287 A1* | 4/2003 | Hirota et al. | 60/297 |
| 2003/0093988 A1* | 5/2003 | Surnilla et al. | 60/274 |
| 2003/0131591 A1* | 7/2003 | Pott et al. | 60/295 |
| 2003/0213229 A1* | 11/2003 | Steinert | 60/274 |
| 2004/0103642 A1* | 6/2004 | Rosel et al. | 60/274 |
| 2004/0148927 A1* | 8/2004 | Schaller | 60/295 |
| 2005/0022504 A1* | 2/2005 | Miura | 60/274 |
| 2005/0097884 A1* | 5/2005 | Verkiel et al. | 60/285 |
| 2005/0132698 A1* | 6/2005 | Nagaoka et al. | 60/295 |
| 2005/0144934 A1* | 7/2005 | Nakatsuji et al. | 60/295 |

* cited by examiner

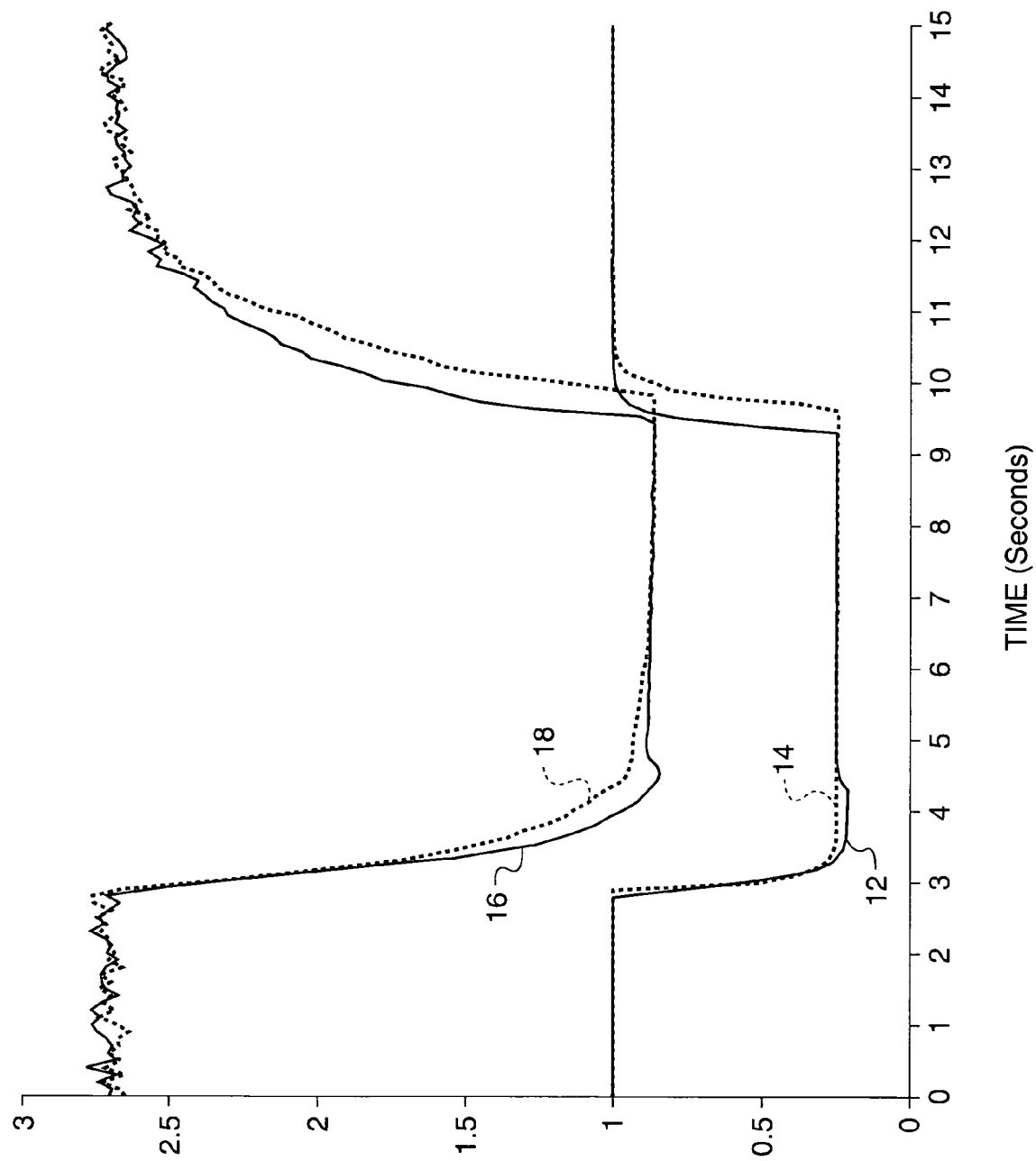

METHOD AND APPARATUS FOR REGENERATING NOX ADSORBERS

TECHNICAL FIELD

This invention relates generally to aftertreatment, and in particular to the regeneration of NOx adsorbers.

BACKGROUND

As emissions from internal combustion engines have become more of a focus for engine manufacturers, an increasing number of designs use NOx adsorbers, also known as a Lean NOx trap ("LNT"), in the exhaust path of the engine. The NOx adsorber adsorbs some of the NOx created in the combustion process, thereby reducing the amount of NOx released into the atmosphere.

The known NOx adsorbers, however, have a tendency to fill up in a relatively short period of time; sometimes as quickly as a few minutes. One technique that counters this degradation is the periodic regeneration of the NOx adsorber, commonly implemented by running the engine in a rich condition for a predetermined period of time. Because most engines today are lean burn engines, however, while the NOx adsorber is regenerating in this rich condition, additional fuel is being used. This correlates to a reduction in the gas mileage/fuel economy for the engine. Due to the high frequency of regeneration, this reduction can equate in some operating conditions to be as large as approximately 4%. To put this in perspective, many engine manufacturers today consider an improvement in fuel economy of tenths of a percent to be meaningful.

SUMMARY OF THE INVENTION

The present invention provides methods and apparatuses for regenerating a NOx adsorber coupled with an exhaust of an engine. An actuator drives a throttle valve to a first position when regeneration of the NOx adsorber is desired. The first position is a position that causes the regeneration of the NOx adsorber. An actuator drives the throttle valve to a second position while regeneration of the NOx adsorber is still desired. The second position being a position that is more open than the first position and operable to regenerate a NOx adsorber.

BRIEF DESCRIPTION OF THE DRAWINGS

FIG. 1 shows a graph of throttle position and lambda for an internal combustion engine according to one embodiment of the invention.

DETAILED DESCRIPTION

FIG. 1 shows a graph of throttle position and lambda for an internal combustion engine according to one embodiment of the invention. The x-axis represents time, in seconds, and the y-axis represents both the lambda value for the inlet air of an internal combustion engine and the throttle position for that same engine (a throttle position of 1 is fully open, 0 is fully closed; lambda value of 1 is stoichiometric).

Line 12 represents the throttle position according to one embodiment of the invention. During normal engine operation, the engine typically operates in a "lean condition" (lambda greater than 1). In this situation, the throttle position may typically be wide open, as seen during seconds 1–3.

When regeneration of the NOx adsorber is desired, as indicated by a sensor or sensors on the engine, for example, the throttle position is changed to a more closed position sufficient to cause the air to fuel ratio (lambda) to become "rich" (a fuel to air ratio that is less than stoichiometric). In one embodiment of the invention, this first position may be a valve position that is approximately 20% open, although other percentages could also be used. This "rich condition" regenerates the NOx adsorber by ways known to those skilled in the art, and will not be repeated here.

Typically an engine control system (not shown) will determine a desired steady state "rich" condition to cause the regeneration of the NOx adsorber, and its corresponding throttle position. When regeneration of the NOx adsorber is desired, the throttle position is driven to a position that is more closed than the steady state "rich" throttle position, as seen in seconds 3–4. In one embodiment of the invention, this second position may be a valve position that is approximately 25% open, although other percentages could also be used.

After some first predetermined period of time, the throttle position is driven (e.g., opened) to a second position, e.g., approximately a steady state "rich" throttle position, and maintained at that position for a second predetermined period of time. The second predetermined period of time is a time sufficient to allow the NOx adsorber to regenerate to some desired extent. The regeneration may be 100%, or some desired percentage less than 100%. In this example, the throttle position is held at the second position for approximately 5 seconds, although other durations could also be used.

After the desired amount of regeneration of the NOx adsorber is achieved, the throttle position may be moved back to it's "lean" position for normal engine operation, as shown in seconds 9–15.

Line 14 shows the throttle position for an engine not using the two-step process described above and labeled as line 12. Line 16 shows the corresponding lambda for the two-step throttle position line 12, according to one embodiment of the invention. Line 18 shows the corresponding lambda for the one-step throttle position line 14, according to one embodiment of the invention.

It is worth noting that by using the two-step process (line 12), the overall duration when the engine is running "rich" may be decreased relative to the one step process (line 14) and still achieve a similar degree of regeneration of the NOx adsorber. This can be seen by comparing the areas above the curve for lines 16 and 18. In this example, approximately 1 second may be shaved per regeneration period, although results may vary depending on the particular application. This reduction of 1 second in the "rich" operation of the engine can equate to approximately a 0.5% increase in fuel economy as compared to the process shown in line 14.

Industrial Applicability

A sensor or sensors (not shown) for an engine can be used to determine when the regeneration of a NOx adsorber is desired by ways known to those skilled in the art. An engine control system (not shown) can then drive the throttle position to a point that is more closed than the steady state position that regenerates the NOx adsorber. After a predetermined period of time, the throttle position is opened to approximately the steady state position for regeneration. By using this two-step process, the throttle position is able to achieve a lambda less than 1 more quickly. This shortens the duration for regeneration and the time that the engine runs "rich", thereby potentially increasing the fuel economy for the engine.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for regenerating a NOx adsorber coupled with an exhaust of an engine, comprising:
   actuating a throttle valve to a first position when regeneration of the NOx adsorber is desired, the first position operable to cause the regeneration of the NOx adsorber; and
   actuating the throttle valve to a second position while regeneration of the NOx adsorber is still desired, the second position being a position that is more open than the first position and operable to regenerate a NOx adsorber.

2. The method of claim 1 wherein the first throttle position comprises a position being about 20% open.

3. The method of claim 1 wherein the second throttle position comprises a position being about 25% open.

4. The method of claim 1 wherein the first throttle position comprises a throttle position operable to control a lambda for an engine to about 0.85.

5. The method of claim 1 wherein the first throttle position comprises a throttle position operable to control a lambda for an engine to about 0.87.

6. A method for regenerating a NOx adsorber, comprising:
   determining a characteristic that is indicative of a desired regeneration of the NOx adsorber;
   actuating a throttle to a first position for a first predetermined period of time, the first position being a position that is more closed than a steady state rich operation throttle position when the characteristic indicates that regeneration is desired, the steady state rich operation throttle position being a steady state desired throttle position operable to regenerate the NOx adsorber; and
   actuating the throttle to a second position for a second predetermined period of time, the second position being a position more open than the first position and corresponding to about the steady state rich operation throttle position.

7. The method of claim 6 wherein the first throttle position comprises a position being about 20% open.

8. The method of claim 6 wherein the second throttle position comprises a position being about 25% open.

9. The method of claim 6 wherein the first throttle position comprises a throttle position operable to control a lambda for an engine to about 0.85.

10. The method of claim 6 wherein the first throttle position comprises a throttle position operable to control a lambda for an engine to about 0.87.

11. The method of claim 6 wherein the first predetermined period of time comprises a period of time relatively shorter than the second predetermined period of time.

12. The method of claim 11 wherein the first predetermined period of time comprises about 1.5 seconds and the second period of time comprises about 5 seconds.

13. A method for regenerating a NOx adsorber, comprising:
   determining a first characteristic that is indicative of a desired regeneration of the NOx adsorber;
   determining a steady state lambda operable to regenerate the NOx adsorber;
   controlling a lambda of a gas that is transmitted to the NOx adsorber to a first lambda for a first predetermined period of time when the first characteristic indicates that regeneration of the NOx adsorber is desired, the first lambda being a lambda that is less than a steady state lambda that is operable to regenerate the NOx adsorber; and
   controlling the lambda of the gas to a second lambda for a second period of time, the second lambda being a lambda corresponding to about the steady state lambda that is operable to regenerate the NOx adsorber.

14. The method of claim 13 wherein the first lambda comprises about 0.85.

15. The method of claim 13 wherein the second lambda comprises about 0.87.

16. An apparatus for regenerating a NOx adsorber, comprising:
   an intake air path for an engine;
   a throttle valve disposed in the intake path of the engine;
   a throttle valve actuator coupled with the throttle valve and operable to move the throttle valve between a first position and a second position;
   at least one sensor coupled with the engine and operable to transmit at least one signal indicative of a desire to regenerate the NOx adsorber; and
   a controller coupled with the at least one sensor to receive the at least one signal indicative of a desire to regenerate a NOx adsorber, the controller coupled with the throttle valve actuator and operable to transmit a first signal to the throttle valve actuator as a function of the at least one signal indicative of a desire to regenerate the NOx adsorber, the first signal operable to cause the throttle valve actuator to actuate the throttle valve to a first position for a first predetermined period of time, the first position being a position that is more closed than a steady state rich operation throttle position, and cause the throttle valve actuator to actuate the throttle valve to a second position for a second predetermined period of time, the second position being a position corresponding to about the steady state rich operation throttle position.

17. The apparatus of claim 16 wherein the first throttle position corresponds to a position that causes the throttle to be about 20% open.

18. The apparatus of claim 16 wherein the second throttle position corresponds to a position that causes the throttle to be about 25% open.

19. The apparatus of claim 16 wherein the second throttle position corresponds to a position that causes air within the intake air path to have a lambda of about 0.85.

20. The apparatus of claim 16 wherein the first throttle position corresponds to a position that causes air within the intake air path to have a lambda of about 0.85.

21. The apparatus of claim 16 wherein the first predetermined period of time comprises a period of time relatively shorter than the second predetermined period of time.

22. The method of claim 21 wherein the first predetermined period of time comprises about 1.5 seconds and the second period of time comprises about 5 seconds.

* * * * *